United States Patent
Greenfield et al.

(10) Patent No.: US 7,936,814 B2
(45) Date of Patent: May 3, 2011

(54) CASCADED OUTPUT FOR AN ENCODER SYSTEM USING MULTIPLE ENCODERS

(75) Inventors: James D. Greenfield, Binghamton, NY (US); Barbara A. Hall, Endwell, NY (US); Agnes Y. Ngai, Endwell, NY (US); Edward F. Westermann, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 2333 days.

(21) Appl. No.: 10/114,019

(22) Filed: Mar. 28, 2002

(65) Prior Publication Data

US 2003/0185297 A1    Oct. 2, 2003

(51) Int. Cl.
*H04N 7/12* (2006.01)
(52) U.S. Cl. .................................. 375/240.01
(58) Field of Classification Search ............. 375/240.01, 375/240.1, 240.26; 370/477; *H04N 7/12*
See application file for complete search history.

(56) References Cited

U.S. PATENT DOCUMENTS

| | | |
|---|---|---|
| 5,057,940 A | 10/1991 | Murakami et al. |
| 5,062,076 A | 10/1991 | Ho et al. |
| 5,216,503 A | 6/1993 | Paik et al. |
| 5,337,085 A | 8/1994 | Lee et al. |
| 5,506,844 A * | 4/1996 | Rao .................... 370/477 |
| 5,600,374 A | 2/1997 | Shikakura |
| 5,646,687 A | 7/1997 | Botsford, III et al. |
| 5,729,293 A | 3/1998 | Keesman |
| 5,805,220 A | 9/1998 | Keesman et al. |
| 5,872,556 A | 2/1999 | Rackley et al. |

FOREIGN PATENT DOCUMENTS

JP    11-041429    2/1999

OTHER PUBLICATIONS

D.E. Davis; "Field Stitching Method"; IBM Technical Disclosure Bulletin, vol. 22 No. 1, Jun. 1979.

* cited by examiner

*Primary Examiner* — Young Lee
(74) *Attorney, Agent, or Firm* — Whitham, Curtis, Christofferson & Cook, P.C.; David Cain

(57) ABSTRACT

Plural encoders operating in parallel to achieve a desired data rate have their respective outputs combined by an autonomously operating arrangement for transfer of data to a direct memory access arrangement from respective encoders in order in response to a signal asserted upon completion of encoding and output of encoded data corresponding to a predetermined portion of input data. Buffering of encoder output can be either internal or external to the encoders. Zero bytes which may be inherently generated at the beginning and end of an encoder output stream may be suppressed to improve encoded signal quality and efficiency.

4 Claims, 2 Drawing Sheets

CASCADED OUTPUT FOR AN ENCODER SYSTEM USING MULTIPLE ENCODERS

BACKGROUND OF THE INVENTION

1. Field of the Invention

The present invention generally relates to encoder systems capable of digital encoding of large amounts of data at high speed and, more particularly to encoder systems for encoding pictorial image information.

2. Description of the Prior Art

Digital transmission of information is preferred over analog transmission for many applications at the present time and provides numerous advantages such as increased noise immunity, ease of error detection and recovery and the possibility of extreme data compression for facilitating rapid transmission and storage and the like. These advantages often become of significantly increased importance as the volume of data of interest increases. Relatively massive files, databases and other aggregations of data are becoming more common in an increasing variety of applications and the need for high speed encoding, often in combination with data compression, has correspondingly increased.

One such application that presents extreme demands for high speed encoding of a massive volume of data is pictorial communications particularly at high resolution and/or in rapidly presented sequences which provide the illusion of motion. The amount of data in a single image may contain several million image points or "pixels", each of which must be encoded to represent fine gradations of both color and intensity. To create the illusion of motion simulating actual motion of objects, such images must be presented at a rate above the flicker fusion frequency of human visual perception, generally considered to be about 24 to 30 images per second. Thus it can be seen that even very short sequences of digitized motion picture could require billions of bytes of data to be transmitted and/or stored.

In order to accommodate such massive amounts of information with commercially available and sufficiently inexpensive hardware to be used by persons desiring such information or the general public at large, it is necessary to reduce the volume of data by compression. Several standards for image data compression have been proposed and widely adopted. Among the more well-accepted standards for compression of image data are the JPEG (Joint Photographic Experts Group) standard and the MPEG (Moving Picture Experts Group) standard, both of which are known in several versions at the present time. The JPEG standard allows optimal resolution to be maintained for any arbitrary degree of data compression and compression by a factor of twenty or more often does not result in loss of image quality or fidelity which is generally perceptible. The MPEG standard is similar to the JPEG standard in many aspects but also allows redundancy of portions of the image from frame to frame to be exploited for additional data compression.

It can be readily appreciated that such large degrees of data compression during encoding is complex and requires substantial processing capacity, particularly for motion pictures and especially when high resolution is required as in high-definition television (HDTV) in broadcast applications. To obtain the required data rates from encoder systems of commercially acceptable cost, it is the current practice to use a plurality of commercially available encoders in parallel to process respective portions of an input image. However, while required data rates can be obtained by this expedient, substantial further post-processing overhead and data latency has been necessitated.

Specifically, accepted image data compression standards such as JPEG and MPEG, alluded to above, may yield different amounts of data for images or portions thereof encoded at a given degree of fidelity or resolution (i.e. the converse of the desirable property of maintaining maximum image quality for a given amount of data or degree of compression). Therefore, each encoder must complete processing before the amount of digital data resulting from the encoding process is known so that the individual data streams from the respective encoders can be combined into a single continuous output data stream. That is, the exact number of bits in the encoder data stream for each encoder corresponding to each respective portion of the image must be reported in order to control the high-speed switching necessary to form a continuous data stream from a plurality of data streams output from individual encoders.

In a non-real time system, the individual data streams and individual bit counts are written to files in mass storage such as a hard disk and retrieved for later processing and assembly into a single data stream. However, in a real-time system such as HDTV in broadcast applications, the individual encoder output streams must be "stitched" together on the fly utilizing similar storage in a large rapid access memory such as massive amounts of dynamic or static random access memory. This process also requires significant amounts of processing to properly control read and write operations at the necessary data rates. Latency is also introduced since the encoder system cannot begin to use or process the individual output streams until the encoding operation is complete for a full frame or field, the encoded data stored and the bit counts retrieved. Control of the memory and minimization of the required size thereof is also complicated by the fact that the size of the output stream for an image portion cannot be known or accurately predicted before encoding and storage is completed; introducing the possibility that data for one portion of the image may not be stored at a continuous sequence of addresses to avoid overwriting encoded data for another portion of the image.

Therefore, in addition to other difficulties and complexities of massive encoding and compression, there is a trade-off in design between the cost of memory and the amount of processing overhead and memory control within the capacity for producing necessary data rates. Processing overhead may also be increased and hardware requirements increased by increased data latency which can severely complicate synchronization.

SUMMARY OF THE INVENTION

It is therefore an object of the present invention to provide an arrangement and method for combining bit streams from a plurality of encoders in substantially real time and with low latency and low processing overhead while minimizing memory requirements.

It is another object of the invention to provide a simple and economical encoder system capable of accommodating HDTV data rates.

In order to accomplish these and other objects of the invention, an encoding method is provided including steps of establishing an order between a plurality of encoders corresponding to portions of input data, asserting a signal upon completion of encoding of a respective portion of said input data by a respective encoder, and transferring output of respective encoders in accordance with the order to a direct memory access arrangement responsive to the signal.

In accordance with another aspect of the invention, an encoding system is provided including a plurality of encoders operating in parallel to encode respective portions of input data in a predetermined order, an arrangement such as a controlling processor for asserting a signal indicative of an extent of encoded data output from each respective encoder, and a direct memory access arrangement for writing encoded data to system memory in said order responsive to the signal indicative of the extent of encoded data.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
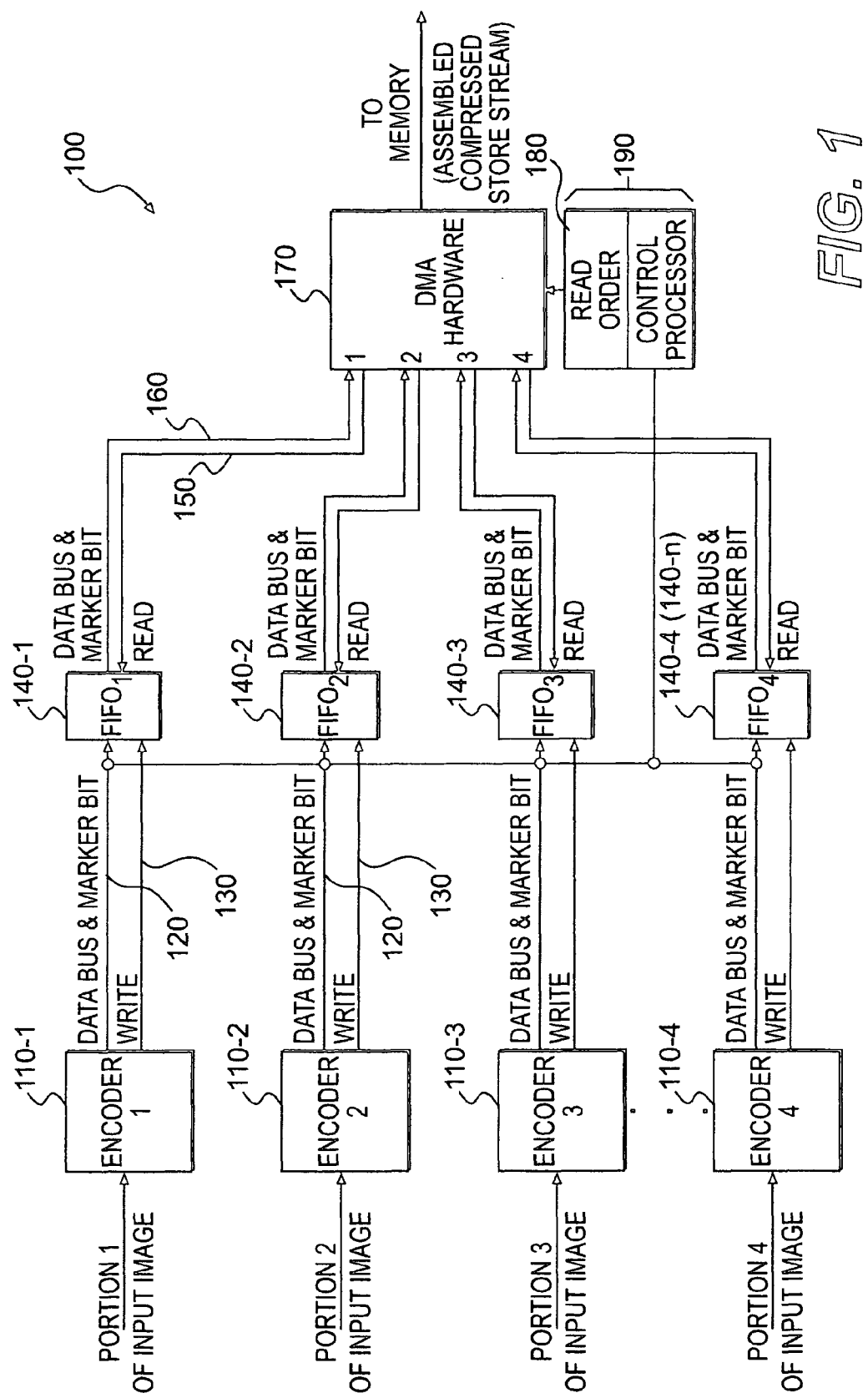
FIG. 1 is a high-level schematic block diagram of a first preferred embodiment of the invention.

Referring now to the drawings, and more particularly to FIG. 1, there is shown a first preferred embodiment of the invention in schematic block diagram form. This embodiment of the invention assumes that the encoders do not internally buffer their respective output data streams. The second preferred embodiment which will be discussed in detail below assumes encoders which provide such internal buffering of their respective outputs.

The encoder system of FIG. 1 includes a plurality of encoders 110-1, 110-2, 110-3 and 110-4; the number of which is not important to the practice of the invention although four encoders of commercially available capacity for real-time encoding of motion picture data of conventional resolution are generally sufficient for producing data rates sufficient for encoding of HDTV data in broadcast environments. A first-in-first-out (FIFO) buffer 140-1, 140-2, 140-3, 140-4 is provided for each respective encoder 110. The length of the FIFO buffers is unimportant to the practice of the invention and could be only of sufficient length to accept encoded data for a respective portion of the input image. It will be appreciated that the FIFO function does not increase latency since data may be read from a FIFO buffer as soon as it is written. This is distinct from prior processing as alluded to above where data for a full field or frame must be written to memory and evaluated before assembly into a single data stream can be commenced. The width of the FIFOs 140 and data bus 120 should be one bit greater than the encoder output data. For example, it is preferred to transfer encoded data in two-byte lengths (sixteen bits) and data bus architectures generally accommodate eighteen bits to handle parity bits and the like. Therefore, it is preferred but not critical to the practice of the invention that the FIFO width should be seventeen bits. The additional bit is provided in parallel with encoded data in the data bus (or by a separate connection) as a marker which is preferably generated by the encoder or, preferably, in the controlling processor but could be generated in a number of ways in hardware such as a toggle signal asserted when data for a new frame is input and at a macroblock count corresponding to a predetermined portion of the image. Other arrangements will be evident to those skilled in the art. A write signal 130 is also generated by the decoder or controlling processor 190 and output to control writing operations to the respective FIFOs.

The FIFOs 140-1 through 140-4 (or 140-n) are connected to direct memory access (DMA) hardware 170 by busses 160 which are of a width corresponding to bus 120 including the marker bit and a control signal connection 150 which controls read out of data from a selected FIFO to the DMA hardware 170 and transfer to memory. Thus, the DMA hardware is capable of reading data from any FIFO to the exclusion of other FIFOs and passing the data to a system memory in an effectively seamless stream. (If time gaps are engendered by switching time in the DMA hardware, they are not reflected in either segmentation in storage or timing upon readout from system memory.) It is assumed that a fixed order of FIFO reading is established in connection with the DMA hardware as illustrated at 180 and which can be accomplished in many ways evident to those skilled in the art (e.g. a counter incremented each time a marker bit is received by the DMA hardware) if not provided in the DMA hardware itself.

Assume now that the logic state of the marker bit is, for example, "0" whenever an encoder 110-1 through 110-4 is outputting compressed data and that when the encoder completes encoding and outputting of its portion of the input image data there is a dummy write with the marker bit set to "1". Upon initialization and input of image data to the encoders, the DMA hardware would start to read encoded output from the first FIFO 110-1 and would test the marker bit as each piece of data is received. If the marker bit is "0", the data is sent to system memory but if the marker bit is "1" the data is discarded (since it will have already been transferred to system memory from a prior write to and read from the FIFO and the data discarded corresponds to the dummy write described above). Further, if the marker bit is a "1", the DMA hardware is switched to begin reading from the next FIFO (e.g. 110-2 and so on) where the marker bit will be "0" for valid, newly encoded data and the dummy write will be marked with a "1", as before, at the end of the encoded data. This process proceeds through the FIFOs in order and results in encoded data corresponding to ordered portions of the input image to be stored contiguously in system memory from which the encoded signal for the entire input image can be read out in a continuous and seamless data stream and with minimal latency. It will be noted that this process does not require the length of encoded data from each encoder to be known or determined and that the encoding of any portion of the data (e.g. image data) need not be completed before transfer to system memory and/or assembly of data from different decoders is begun.

It should also be appreciated that as the process continues, the result is an assembled data (e.g. HDTV) stream stored at one area of system memory. This result is much more efficient, particularly in terms of processing overhead and data latency (as well as consequent processing for answering difficulties of synchronization and the like when latency is excessive) than storing the encoder output in discrete, independent areas of system memory and assembling them into a single stream upon read out from system memory in a separate process. The operation of the DMA hardware or the DMA hardware itself is also simplified since the DMA hardware only writes to a single area or location of system memory and thus, in effect, multiplexes the encoded data into a single data stream. Moreover, the combination of the encoders, FIFOs and DMA hardware, once synchronized to the input image data, operates essentially autonomously and the encoded output data is synchronized for transmission by readout from system memory.

Figure 2:
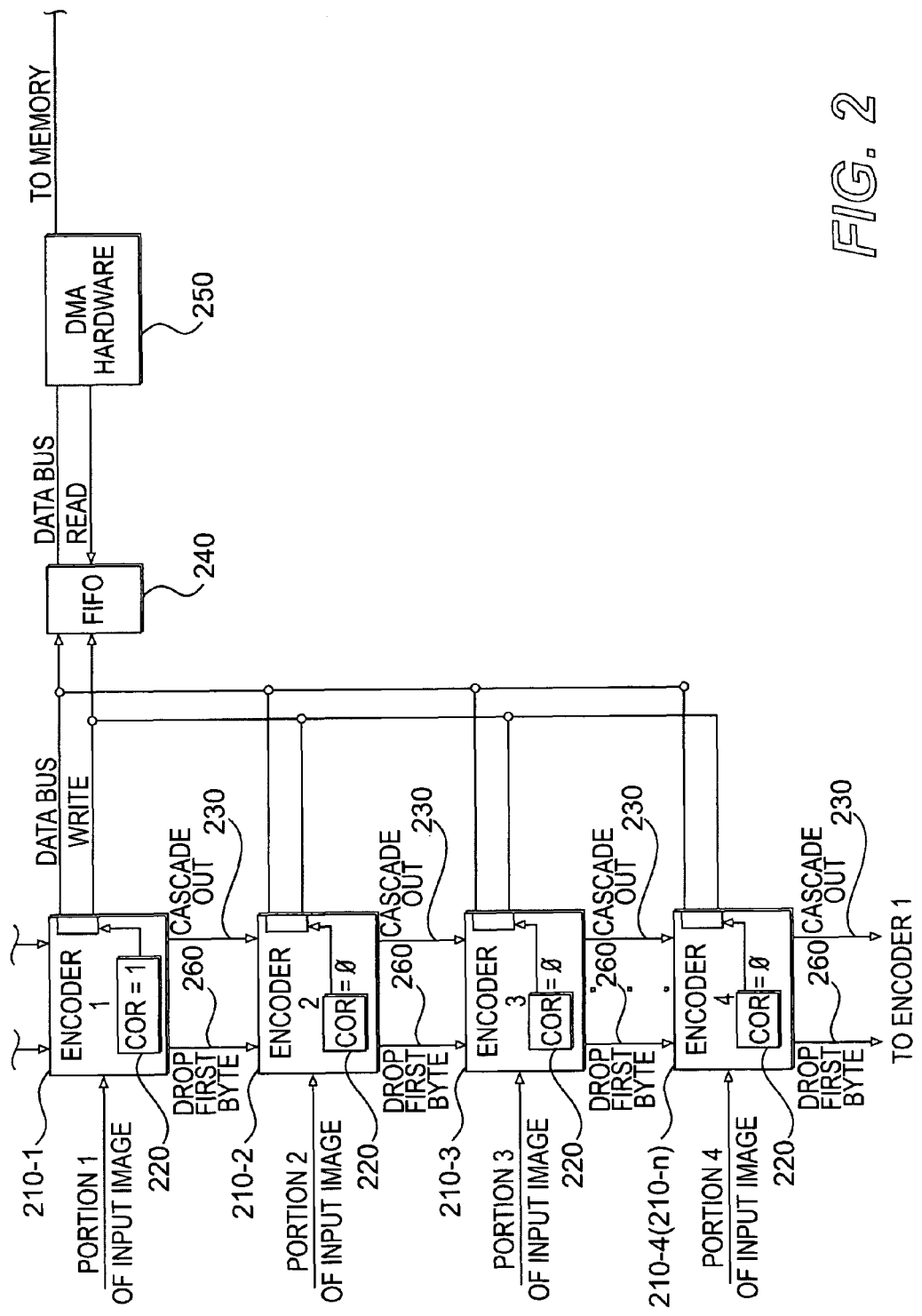
FIG. 2 is a high-level schematic block diagram of a second preferred embodiment of the invention, and, further, illustrates a perfecting feature in accordance with the invention usable with either of the preferred embodiments of FIG. 1 or FIG. 2 and variants thereof.

Referring now to FIG. 2, a second preferred embodiment of the invention will now be discussed in detail. As alluded to above, the second embodiment differs from the first, described above, in various particulars as a consequence of the encoders being able to internally buffer their output. Other features are conceptually or functionally similar to be first embodiment, described above.

As with the first embodiment, a plurality of encoders 210-1, 210-2, 210-3, 210-4 (210-n) are provided and the number of encoders employed is not important to the practice of the invention although four encoders is preferred in view of the preferred application to real-time HDTV encoding. Likewise, each encoder is preferably associated with a predetermined respective portion of the input image and data corresponding thereto or other data to be encoded.

In this embodiment, each of the encoders 210 is associated with (and preferably contains internally) a cascade ownership register (COR) 220. This register contains a single bit cascade ownership signal and control connections between the encoders are connected in a circular or re-entrant fashion by connections 230 to provide a cascade-out signal from one encoder as a cascade-in signal to the next encoder in order and thus transfer ownership such that only one COR 220 can have a given logical value (e.g. "1") while the other CORs 220 are constrained to have a different logical value (e.g. "0"). This feature of the second embodiment can be considered conceptually and functionally similar to the marker bit to indicate the extent of encoded data which, in one state, will indicate valid data and enablement of transfer to system memory.

Other alternative arrangements will be evident to those skilled in the art such as arranging the CORs as registers or stages of a ring counter outputting respective enable signals to the internal buffer registers of the encoders. Thus, regardless of the specifics of the arrangement used, only one encoder can "own" the output bus and output data thereto; allowing all encoders to be connected to the output bus in parallel. (If the COR value is "0" and the associated encoder does not "own" the bus, the encoder buffer outputs are preferably made to appear as a high impedance, as is well-understood in I/O circuits and so-called tri-state circuits, in particular.) This connection/ownership arrangement of interfaces in general is sometimes referred to as being "dotted" to the output bus or the single FIFO 240 input in accordance with the logical combination function effectively performed.

The FIFO buffer 240 is provided in order to facilitate synchronism of data transfer by DMA hardware 250 in a manner similar to that of the arrangement of FIG. 1 and assure optimal throughput capacity. However, other expedients could be used, as well, such as the omission of the FIFO buffer and direct enablement of the output buffers of the encoders directly. However, avoidance of loss of data and maximal encoder throughput would not be ensured in such a case. Since the cost of a single FIFO buffer of a capacity limited to storage of encoded data for the image portion to which a respective encoder corresponds is relatively low and allows avoidance of data loss and maximal encoder throughput, provision of the single FIFO buffer 240 is preferred.

In operation, when a first encoder (e.g. 210-1) completes output of its portion of the encoded and/or compressed data stream, the encoder resets its COR (e.g. to "0") and asserts its cascade-out signal to pass ownership to the next encoder, buffering its own output until it again receives a cascade-in signal (and consequent ownership of the output bus) from the last following or immediately preceding encoder (e.g. a cascade-in signal to encoder 210-1 from encoder 210-n). The next following encoder (e.g. 210-2) will output its buffered encoded data until done and transfer ownership to the next encoder (e.g. 210-3) and so on. The sequentially output encoded data is temporarily buffered in FIFO 240 and transferred to system memory as in the first embodiment by and under control of DMA 250. This allows largely autonomous operation to write the encoded data to a single location or area of system memory and synchronous read out of a seamless, continuous data stream from system memory, as before.

In view of the foregoing, it is seen that the invention provides a method and apparatus of variant forms for combining, with low data latency, the outputs from a plurality of encoders operating in parallel to achieve high throughput levels. The invention can be implemented with a relatively small amount of hardware and operates substantially autonomously to reduce processing overhead. A simple and economical encoder system capable of accommodating HDTV data rates is provided, as well.

Referring again to FIG. 2, a perfecting feature of the invention usable with the embodiment of the invention in accordance with FIG. 2 will now be discussed in detail. As with any compression technique, particularly in combination with an encoding process, an important goal is to output as little data as possible. However, when an encoder is outputting the last bytes of data in a data stream (e.g. the last data for the portion of the image to which the encoder corresponds), the data must be padded with bits (e.g. zeroes) until there is enough data (e.g. a bytes boundary in accordance with MPEG and some other compression standards) to perform a compressed store write that is aligned with a byte boundary. Also, most compression standards call for the first piece of data to be a (e.g. MPEG) byte-aligned start code generally of the form hex "000001XX" where XX is the type of start code. Further, the first write from any encoder will begin with a zero byte. Therefore, extra zero bytes which carry no information and which may delay information-bearing signals being reached for encoding after transmission or retrieval from memory may be placed in the encoded data and thus reduce the quality of the encoding and the encoded signal as well as introducing inefficiency in storage, transmission and encoding and, with motion image data, possibly introducing synchronization problems and visually perceptible artifacts or equivalent problems in other substantially real-time data.

The perfecting feature of the invention detects the occurrence of zero bytes in any of a number of ways but preferably with the simple expedient of a NOR gate to test all bits of the last byte of each encoder, and to issue a drop first byte signal when a zero byte is detected. This signal can be transferred to the next encoder, as shown at 260 (or later in the FIFO, DMA hardware and system memory pipeline), in conjunction with the COR signal, in order to suppress the first zero byte of the output of the next encoder and to shift the remainder of its data stream in the embodiment of FIG. 2. The same effect could also be achieved as a perfecting feature of the embodiment of FIG. 1 by adding a second marker bit to control dropping of a zero byte, if present, and shifting the output stream in the DMA or a respective FIFO upon change of the particular FIFO providing output.

This results in the removal of a byte which has effectively been replaced by padding of the data output from the previous encoder and the start code remains syntactically correct; preserving the format specified in the compression standard while bytes which carry no information are removed from the data stream. It will be appreciated that this perfecting feature of the invention is applicable to other single and multiple byte word formats where padding bits match initial bits of a start code.

This perfecting feature of the invention thus allows all excess zero bits or bytes which may result from the use of multiple encoders to be removed from the combined data stream. By the same token, this perfecting feature of the invention removes inefficiencies and compromise of encoded signal quality that would otherwise inherently result from the use of multiple encoders to achieve a desired data rate while outputting as few bits as possible. Therefore, a greater number of slower but less expensive encoders may be used to achieve any arbitrarily high data rate with minimal data latency; effectively multiplexing the encoder output.

While the invention has been described in terms of a single preferred embodiment, those skilled in the art will recognize that the invention can be practiced with modification within the spirit and scope of the appended claims.

The invention claimed is:

1. A method of combining encoded signals from a plurality of encoders operating in parallel and associated with respective ordered portions of input data, said method comprising steps of
    establishing an order between said plurality of encoders corresponding to said respective ordered portions of input data,
    asserting a signal upon completion of encoding of a respective ordered portion of said input data by a respective encoder, and
    transferring output of respective encoders in accordance with said order to a direct memory access arrangement responsive to said signal to form an encoded data stream corresponding to said input data, wherein said signal is a marker provided by a dummy write to a buffer.

2. A method of combining encoded signals from a plurality of encoders operating in parallel and associated with respective ordered portions of input data, said method comprising steps of
    establishing an order between said plurality of encoders corresponding to said respective ordered portions of input data,
    asserting a signal upon completion of encoding of a respective ordered portion of said input data by a respective encoder,
    transferring output of respective encoders in accordance with said order to a direct memory access arrangement responsive to said signal to form an encoded data stream corresponding to said input data,
    detecting a padding byte as the final byte of output of an encoder for a respective portion of encoded data, and
    discarding an initial byte of encoded output of a next encoder in said order.

3. An encoding system including
    a plurality of encoders operating in parallel to encode respective ordered portions of input data in a predetermined order,
    means for asserting a signal indicative of an extent of encoded data output from each respective encoder corresponding to a said respective ordered portion of input data, and
    a direct memory access arrangement for writing said encoded data to system memory in said order responsive to said signal indicative of said extent of encoded data to form a data stream corresponding to said input data, wherein said signal is a marker signal following a final byte of encoded data from a respective encoder.

4. An encoding system including
    a plurality of encoders operating in parallel to encode respective ordered portions of input data in a predetermined order,
    means for asserting a signal indicative of an extent of encoded data output from each respective encoder corresponding to a said respective ordered portion of input data, and
    a direct memory access arrangement for writing said encoded data to system memory in said order responsive to said signal indicative of said extent of encoded data to form a data stream corresponding to said input data,
    means for detecting a padding byte as the final byte of output of an encoder for a respective portion of encoded data, and
    means for discarding an initial byte of encoded output of a next encoder in said order.

* * * * *